(12) United States Patent
Zimman et al.

(10) Patent No.: US 8,249,209 B2
(45) Date of Patent: Aug. 21, 2012

(54) SYNCHRONOUS ONE-BIT INTERFACE PROTOCOL OR DATA STRUCTURE

(75) Inventors: Christopher William Zimman, New York, NY (US); James William Hook, New York, NY (US)

(73) Assignee: Bloomberg Finance L.P., New York, NY (US)

( * ) Notice: Subject to any disclaimer, the term of this patent is extended or adjusted under 35 U.S.C. 154(b) by 2102 days.

(21) Appl. No.: 11/157,380

(22) Filed: Jun. 20, 2005

(65) Prior Publication Data
US 2007/0006181 A1    Jan. 4, 2007

(51) Int. Cl.
*H04L 23/00*    (2006.01)
(52) U.S. Cl. ......... 375/377; 375/354; 375/355; 375/368
(58) Field of Classification Search .................. 375/377, 375/363, 368, 354, 355
See application file for complete search history.

(56) References Cited

U.S. PATENT DOCUMENTS

| | | | |
|---|---|---|---|
| 3,309,463 A | 3/1967 | Roedl | |
| 5,434,628 A * | 7/1995 | Spiero et al. | ................. 348/705 |
| 6,097,754 A | 8/2000 | Fitch et al. | |
| 6,563,879 B1 * | 5/2003 | Anderlind et al. | ............ 375/253 |
| 6,973,484 B1 | 12/2005 | Shinghai et al. | |
| 7,137,564 B2 | 11/2006 | Chen et al. | |
| 7,197,098 B2 | 3/2007 | Johnson | |
| 2002/0101884 A1 | 8/2002 | Pohlmeyer et al. | |
| 2002/0193144 A1 * | 12/2002 | Belski et al. | .................. 455/557 |
| 2004/0233917 A1 | 11/2004 | Rocas et al. | |
| 2005/0140529 A1 | 6/2005 | Choi et al. | |
| 2005/0212831 A1 * | 9/2005 | Graf et al. | ........................ 347/5 |
| 2006/0090117 A1 | 4/2006 | Lin et al. | |

FOREIGN PATENT DOCUMENTS

DE    30 01 331    7/1981

OTHER PUBLICATIONS

Supplementary Partial European Search Report, Dec. 9, 2009, 2 pgs.

* cited by examiner

*Primary Examiner* — Ted Wang
(74) *Attorney, Agent, or Firm* — Frank J. DeRosa; Jon Gordon; Frommer Lawrence & Haug LLP (57) ABSTRACT

Systems and methods provide for data transfer and transmission according to a synchronous one-bit interface protocol. A bit stream is generated including first data to be transferred or transmitted and second data from which a clock period used to encode the first data may be extracted. The bit stream is provided to a processor for decoding. In one embodiment, the bit stream includes a start segment or sequence, a data segment and a stop segment or sequence. A clock period is encoded into and is extracted from the start and/or stop sequences. The data segment is decoded on the basis of the clock period.

3 Claims, 7 Drawing Sheets

SYNCHRONOUS ONE-BIT INTERFACE PROTOCOL OR DATA STRUCTURE

BACKGROUND

The present invention relates to data structures which include first data (which, e.g., may be referred to as message or payload data) that is coded and decoded using a clock period. According to embodiments of the invention, such a data structure also includes second data from which can be extracted the clock period used to code the first data in the data structure and with which the first data in the data structure can be decoded. Such data structures may be used in various data transfer and data communication applications, e.g., to transfer data between a computer terminal and a user device in connection with authentication of the user.

The data structures described herein may be used, e.g., as a coded light signal emitted by a computer terminal to a user device, e.g., as described in U.S. application Ser. No. 10/651,361, filed on Aug. 29, 2003, which is assigned to the assignee of this application. The disclosure of U.S. application Ser. No. 10/651,361 is incorporated herein by reference.

SUMMARY

The invention provides for one or more of the following: encoding, transferring, transmitting, receiving, storing, decoding and using data in a coded data structure. Embodiments of the invention provide data structures that may be decoded without a separate clock signal or other source of synchronization. According to embodiments of the invention, a data structure is encoded with first data, e.g., to be transferred, stored, etc., and second data relating to a clock period, e.g., from which a clock period used to code the data can be extracted. In some embodiments, the data structure includes at least one first data segment, and at least one second data segment which includes data relating to the clock period. According to embodiments of the invention, the data structures are transferred or transmitted with the first data and the second data.

According to an embodiment of the invention, a coded data structure comprises at least one first data segment comprising data coded in accordance with a clock period and at least one second data segment comprising data relating to the clock period and from which the clock period can be extracted.

Embodiments of the invention provide for encoding the data structures disclosed herein. For example, a method for encoding the data structure includes encoding a bit stream with at least one first data segment and at least one second data segment. The at least one first data segment comprising data coded in accordance with a clock period. The at least one second data segment comprising data relating to the clock period. The data in the first data segment is preferably encoded also using the clock period. The data segments are preferably transferred or transmitted sequentially.

In one embodiment, a plurality of data segments including data related to the clock period are generated. In one embodiment, two such data segments are provided, one before the data segment including the clock-encoded data and one after. In some embodiments, at least one data segment includes the clock-encoded data and at least one data segment includes clock-related data. The data segments are generated as a bit stream. In these embodiments, each bit of the bit stream is transferred during transmission for a set clock period.

In some embodiments, the data relating to the clock period is inserted in a start sequence and/or in an end sequence. In these embodiments, the data structure includes a start sequence, followed by a first data segment, followed by an end sequence. In some embodiments, the bit stream comprises a non-return-to-zero bit stream. The first data segment may include an escape sequence. The start and end sequences are examples of second data.

Embodiments of the invention provide for transferring data structures disclosed herein and for transmitting such data structures over a network. In such embodiments, the data structures are generated as described herein, transferred from one component or device to another within the context of a computer and/or a computer system and a peripheral device, or transmitted from one computer or device to another computer or device over a network.

Embodiments of the invention also provide for receiving a data structure as disclosed herein, extracting the clock period from at least one second data segment, and decoding at least one first data segment using the extracted clock period.

Embodiments of the invention also provide systems for data transfer and data communication. An embodiment of such a system includes: at least one processor and at least one computer-readable storage medium storing a set or sets of instructions. The set or sets of instructions are capable of being executed by the processor to implement the methods described herein. For example, a processor encodes data as described herein and a processor decodes data as described herein. The system includes a means for forwarding the encoded data to a processor for decoding, and a means for receiving the forwarded data. For example, such means may comprise e.g., radio frequency (RF), optical, acoustical, electromagnetic, digital and other communications technologies for transmitting and receiving signals.

In an embodiment, the system described above provides that the bit stream is transferred or transmitted wirelessly from one device to another, e.g., optically from a computer monitor (functioning, e.g., as a transmitter) to a device which includes an optical receiver, e.g., a photo conductive device. In this embodiment, the device with the optical receiver may comprise a personal authentication device, and the transferred data is used in an authentication process.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 1b depicts another embodiment of the data structure depicted in FIG. 1a;

DETAILED DESCRIPTION OF THE PREFERRED EMBODIMENTS

Figure 1A:
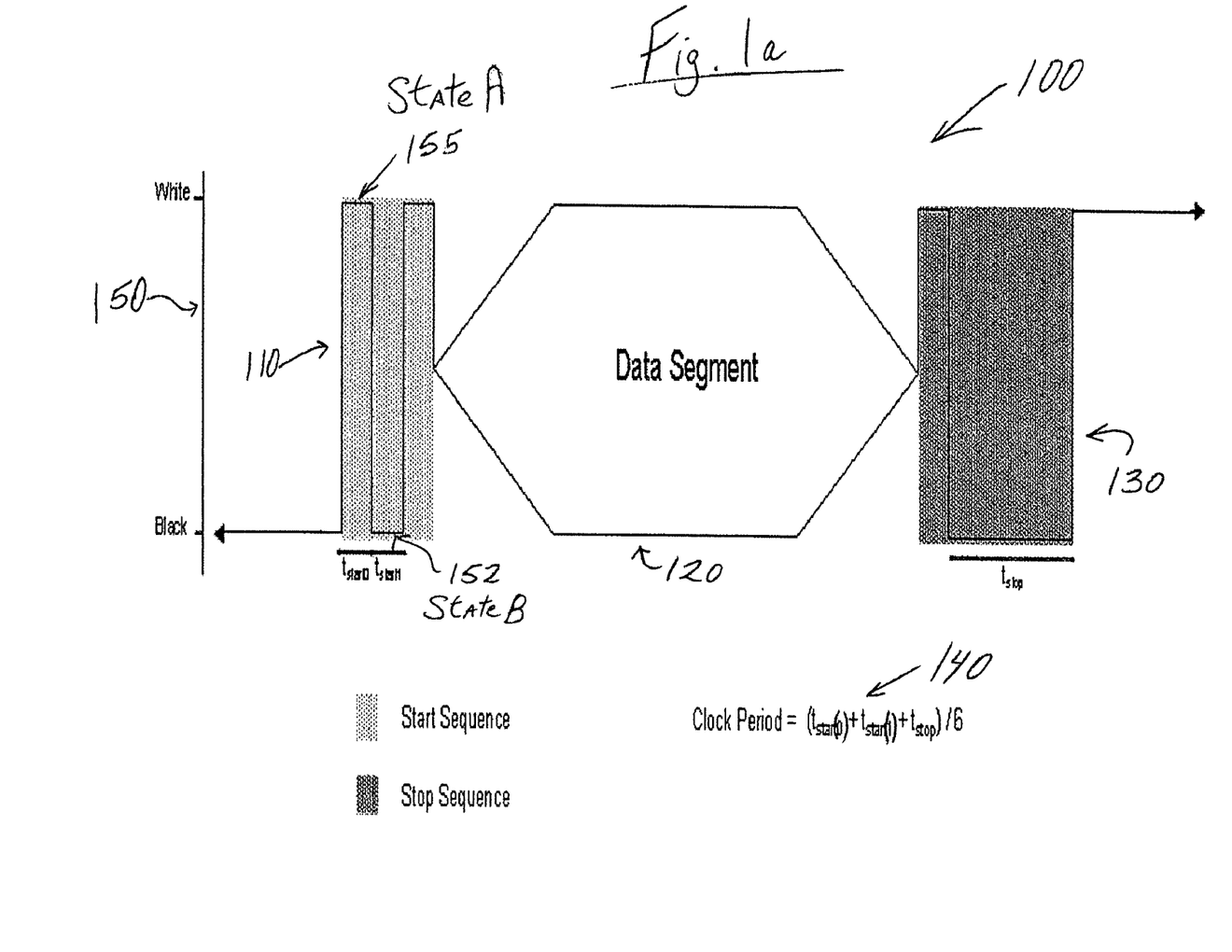
FIG. 1a depicts an embodiment of a data structure which is referred to herein as a synchronous one-bit interface protocol according to an embodiment of the invention.

Preferred embodiments of the invention are now described with reference to the drawings. FIG. 1a depicts an embodiment of a coded data structure or interface 100 according to an embodiment of the invention. Coded data structure 100 is a synchronous one-bit interface protocol that may be used for data transfer between computer devices and/or systems. Data structure 100 represents a bit stream as described above.

In one embodiment, transfer or transmission of the data structure 100 may be performed optically. In other embodiments a radio frequency (RF), electromagnetic, electrical, acoustical, digital or any other suitable interface may be used. For example, referring to FIG. 5, the coded data structure 100 may be optically transferred between a screen portion 503 of a computer monitor 501 of a computer system 500 and a personal authentication device (PAD) 510. The screen 501 may be a liquid crystal display (LCD), a plasma display or a cathode ray tube (CRT) display. The computer system 500 includes a processor (not shown). The data structure 100 is emitted as a bit stream by the screen portion 503, and conforms to the synchronous one-bit interface protocol depicted in FIG. 1a. The bit stream preferably comprises a non-return-to-zero (NRZ) bit stream that is self-clocking. The synchronous one-bit interface protocol is well suited for an application with a one-bit interface that has one driving writer and one or more passive readers. An example of a driving writer is computer system 500 including the screen portion 503. An example of a passive reader includes PAD 510.

U.S. patent application Ser. No. 10/651,361, filed on Aug. 29, 2003, describes devices, methods and systems for controlling access to secure systems, e.g., a computer system. As mentioned above, the data structures and the synchronous one-bit interface protocol described herein may be employed as the coded light signal described in that Application. Also, the data structures and the synchronous one-bit interface protocol described herein may be employed by other signal processing devices including RFID tags, smart cards, transponders, etc.

Referring again to FIG. 1a, the data structure or interface 100 includes a start segment or sequence 110, a data segment 120, and an end segment or sequence 130. The binary states of the interface may be defined as state A (referenced by 152) and state B (referenced by 155). The states represent a bit stream in which each bit in the bit stream is transferred for a set clock period 140. Prior to data transfer, the interface is in state B (152) (binary 0). After data transfer, the interface is held in state A (155) (binary 1). During the start sequence 110, the interface transfers X alternating bits of A (binary 1) and B (binary 0) starting with bit A (binary 1). During the data segment 120, the interface communicates Z bits of data. An escape sequence (not shown) is transferred whenever the communicated data has Y or more contiguous B bits. If there are Y or more contiguous B bits, an additional B bit is transferred. This insures that the interface will only transfer Y contiguous A bits during the stop sequence 130. During the stop sequence 130, the interface transfers Y+1 bits: an A bit followed by Y B bits.

During bit stream transfer or transmission, a receiving device and the sending device may have different, typically asynchronous, clock speeds operating to send and receive the bit stream. When the clock speeds of the devices are different, it may be difficult to decode the bit stream on the receiving end. A clock, used to encode and decode the bit stream. The sending device inserts the clock period when encoding the bit stream, is inserted or encoded into the bit stream at and the receiving device, as described above. The receiving device extracts the clock period from the bit stream during decoding. Referring again to FIG. 1a, the clock period 140 is extracted from the pulse width of bits in the start sequence 110 and the end sequence 130. The clock period is extracted from the first X−1 bits of the start sequence 110 and the last Y bits of the end sequence 130. The duration of each of the X alternating bits of the start sequence are defined as $t_{start}(i)$, and the duration of the last Y B bits of the stop sequence as $t_{stop}$. Hence, the clock period used to clock out the data segment is:

$$\left(\sum_{i=0}^{X-1}(t_{start}(i)) + t_{stop}\right) / (X + Y - 1)$$

An example of a clocking period 140 is shown in FIG. 1a as:

Clocking Period=$(t_{start}(0)+t_{start}(1)+t_{stop})/6$

Figure 5:
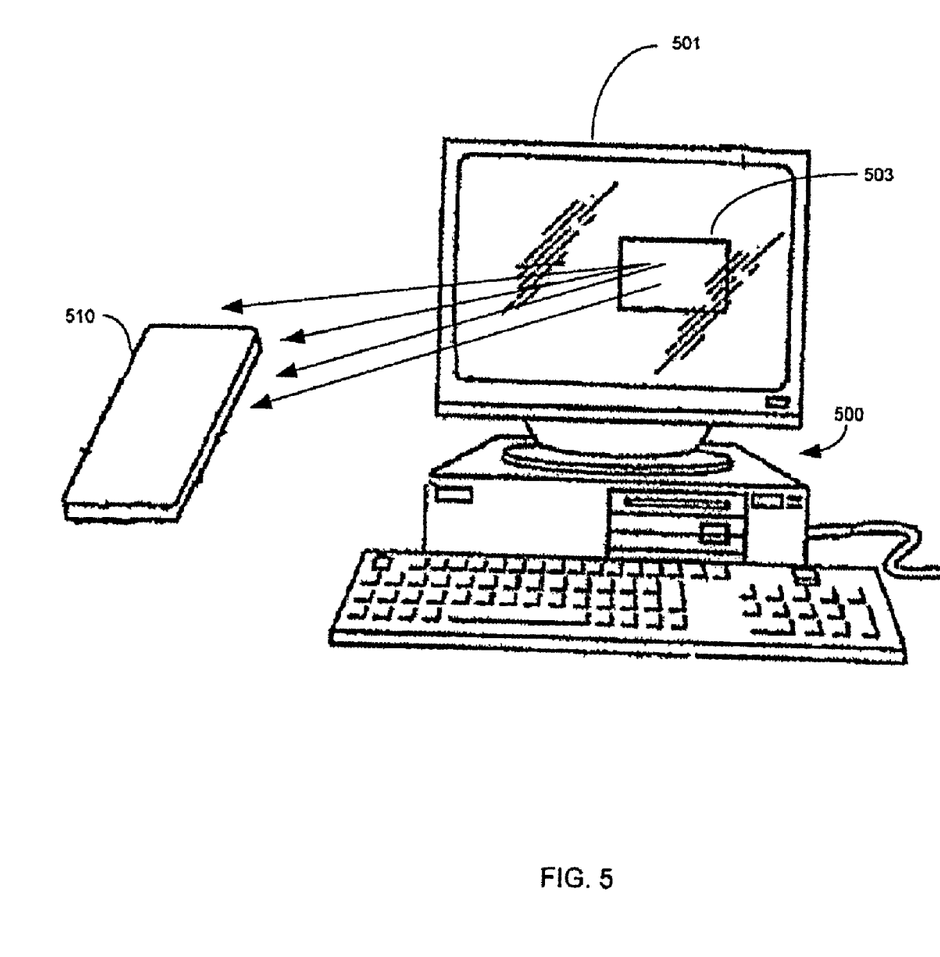
FIG. 5 depicts a diagram illustrating a personal authentication device receiving a coded data structure from a computer monitor in accordance with an embodiment of the invention.

Additionally, during transfer of a bit stream from, for example, a screen portion 503 of a computer system 500 to PAD 510, as depicted in FIG. 5, the binary states of the interface may correspond to the display of the screen portion 503. The screen portion 503 displays a black screen portion in state B and a white screen portion in state A. In the data structure depicted in FIG. 1a, this is illustrated by a scale 150 indicating that in state B (155) (binary 0) the screen portion 503 (FIG. 5) displays a black screen and in state A (152) (binary 1) the screen portion 503 displays a white screen.

Figure 2A:
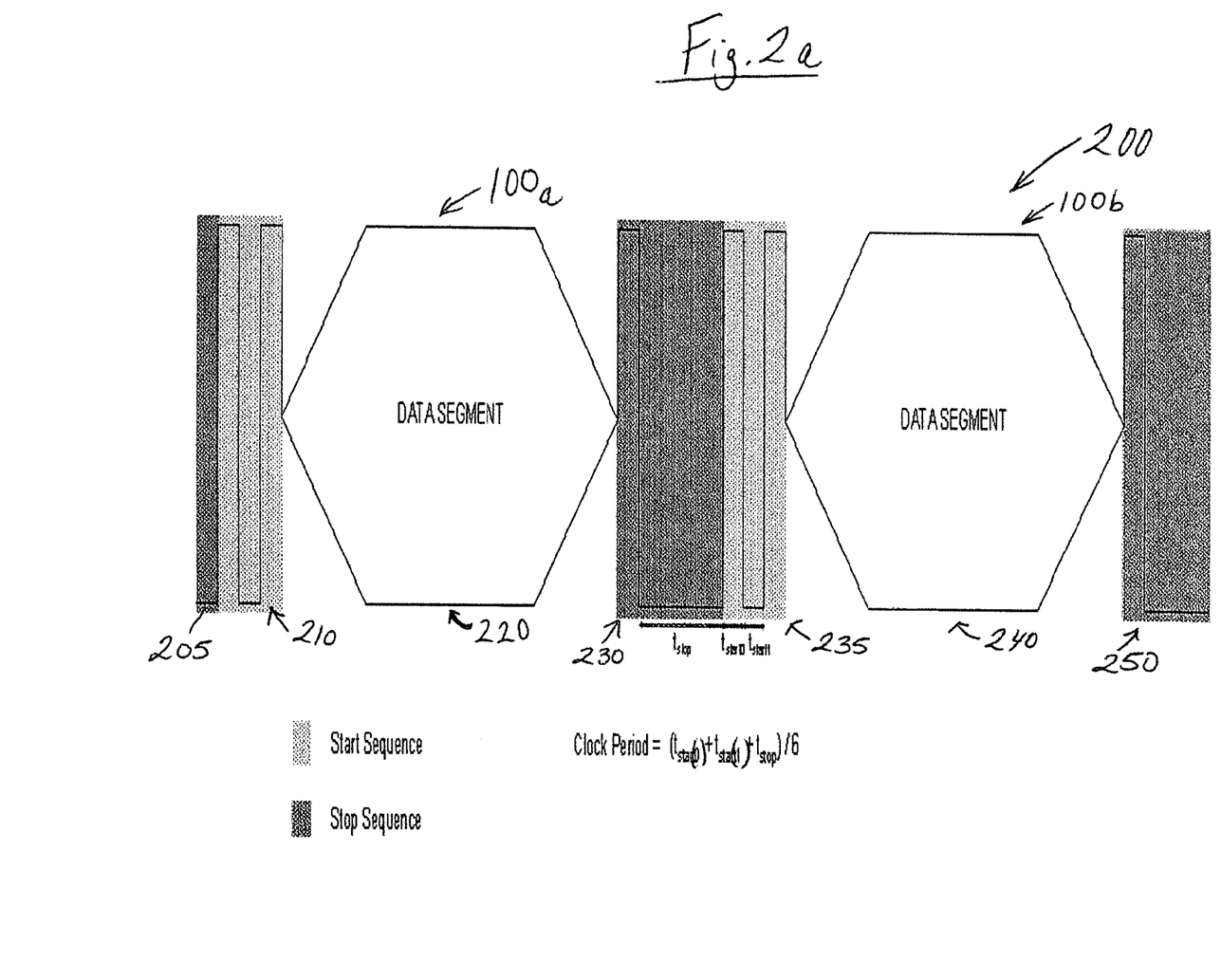
FIG. 2a depicts a bit stream including the synchronous one-bit interface protocol depicted in FIG. 1a repeated according to an embodiment of the invention.

Referring to FIG. 2a, a bit stream 200 includes the synchronous one-bit interface protocol 100 depicted in FIG. 1a but repeated. For example, the repeated protocol 100a, 100b is used to transfer data from a screen portion 503 to a PAD 510 such that the bit stream is repeatedly transmitted from the screen portion 503 to the PAD 510. The number of repetitions may be controlled by the sending device, e.g., a predetermined number of repetitions, or in response to user input into the sending device, e.g., the user inputs a code displayed on the receiving device via a keyboard or other input device of the sending device.

The repeated protocol 100 depicted in FIG. 2a has the same state parameters as in FIG. 1a. The bit stream 200 of protocols 100a, 100b includes an end sequence 205 denoting the end of a previous bit stream, a start sequence 210 of a first protocol 100a, a data segment 220 of the first protocol 100a, an end sequence 230 of protocol 100a, a start sequence 235 of a second protocol 100b, a data segment 240 of the protocol 100b, and an end sequence 250 of the second protocol 100b. The bit stream in FIG. 2a in the embodiment depicted in FIG. 5 provides for flashing of screen portion 503 as follows (B denotes that the screen portion 503 displays a black screen and W denotes that the screen portion 503 displays a white screen portion):

W B W Data Segment W B B B B W B W Data Segment W B B B B . . . .

As mentioned above, an escape sequence for Y or more 0's in a row is transferred during the data segment such that when there are more than Y or more 0's, an additional 0 is sent. This insures that the only time four contiguous zero bits are transferred is in a stop sequence.

The following are examples of encoding (converting) data into a repeated bit stream that complies with the protocol 100, 100a, 100b depicted in FIG. 1a and FIG. 2a. In the following examples, the start sequence of the bit stream is 101 and the stop sequence of the bit stream is 10000. The bits between the start and stop sequences are the data segment which corresponds to a numerical value, e.g., 431.

Data: 0xAAAA
Bit Stream: 10110101010101010000 10110101010101010000 . . . .
Data: 0x0431
Bit Stream: 10100000010000011000110000 10100000010000011000110000 . . . .

In another embodiment, the phases of the start and stop sequences may be inverted for better reception of the bit stream. In some embodiments, the order of the stop sequence, data segment and start sequences may be reversed in the data structure.

Figure 1B:
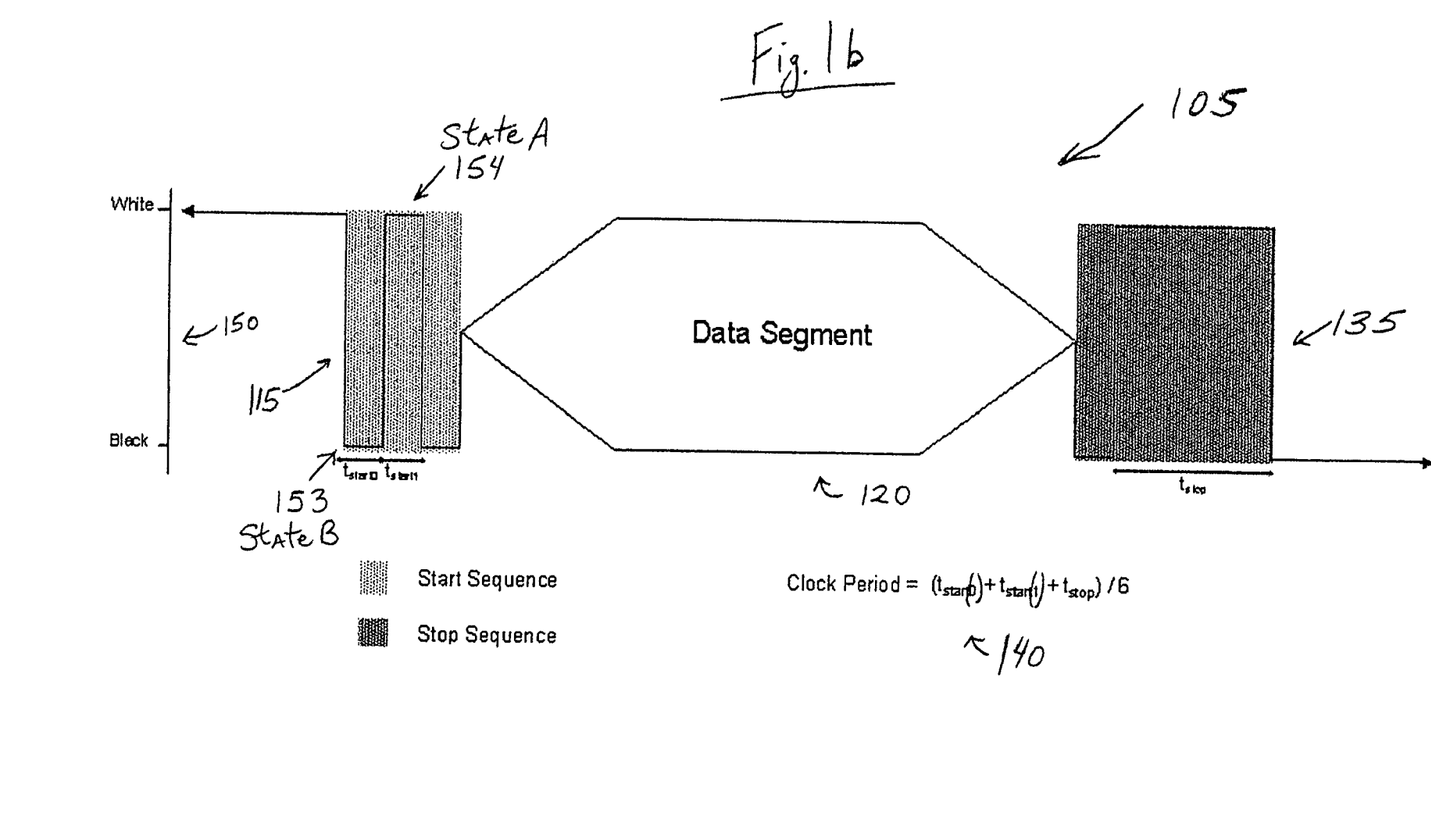

Referring to FIG. 1b, another embodiment of the data structure, similar to the data structure in FIG. 1a, is depicted. In FIG. 1b, the start and stop sequences are inverted. Coded data structure 105 is a synchronous one-bit interface protocol that may be used for data transfer or transmission between computer devices and/or systems as described above in reference to FIG. 1a. Data structure 105 represents a bit stream which preferably comprises a non-return-to-zero (NRZ) bit stream that is self-clocking. Referring again to FIG. 1b, the data structure or interface 105 includes a start segment or sequence 115, a data segment 120, and an end segment or sequence 135. The binary states of the interface may be defined as state A (referenced by 154) and state B (referenced by 153). The states represent a bit stream in which each bit in the bit stream is transferred for a set clock period 140. Prior to data transfer, the interface is in state A (154) (binary 1). After data transfer, the interface is held in state B (153) (binary 0). During the start sequence 115, the interface transfers X alternating bits of B (binary 0) and A (binary 1) starting with bit B (binary 0). During the data segment 120, the interface communicates Z bits of data. An escape sequence (not shown) is transferred whenever the communicated data has Y or more contiguous A bits. If there are Y or more contiguous A bits, an additional A bit is transferred. This insures that the interface will only transfer Y contiguous A bits during the stop sequence 135. During the stop sequence 135, the interface transfers Y+1 bits: a B bit followed by Y A bits.

Referring again to FIG. 1B, the clock period 140 is extracted from the pulse width of bits in the start sequence 115 and the end sequence 135. The clock period is extracted from the first X−1 bits of the start sequence 115 and the last Y bits of the end sequence 135. The duration of each of the X alternating bits of the start sequence are defined as $t_{start}(i)$, and the duration of the last Y A bits of the stop sequence as $t_{stop}$ Hence, the clock period used to clock out the data segment is:

$$\left(\sum_{i=0}^{X-1}(t_{start}(i)) + t_{stop}\right) / (X + Y - 1)$$

An example of a clocking period 140 is shown in FIG. 1b as:

Clocking Period=$(t_{start}(0)+t_{start}(1)+t_{stop})/6$

Additionally, during transfer of a bit stream from, for example, a screen portion 503 of a computer system 500 to PAD 510, as depicted in FIG. 5, the binary states of the interface may correspond to the display of the screen portion 503. The screen portion 503 displays a black screen portion in state B and a white screen portion in state A. In the data structure depicted in FIG. 1b, this is illustrated by a scale 150 indicating that in state B (155) (binary 0) the screen portion 503 (FIG. 5) displays a black screen and in state A (152) (binary 1) the screen portion 503 displays a white screen.

Figure 2B:
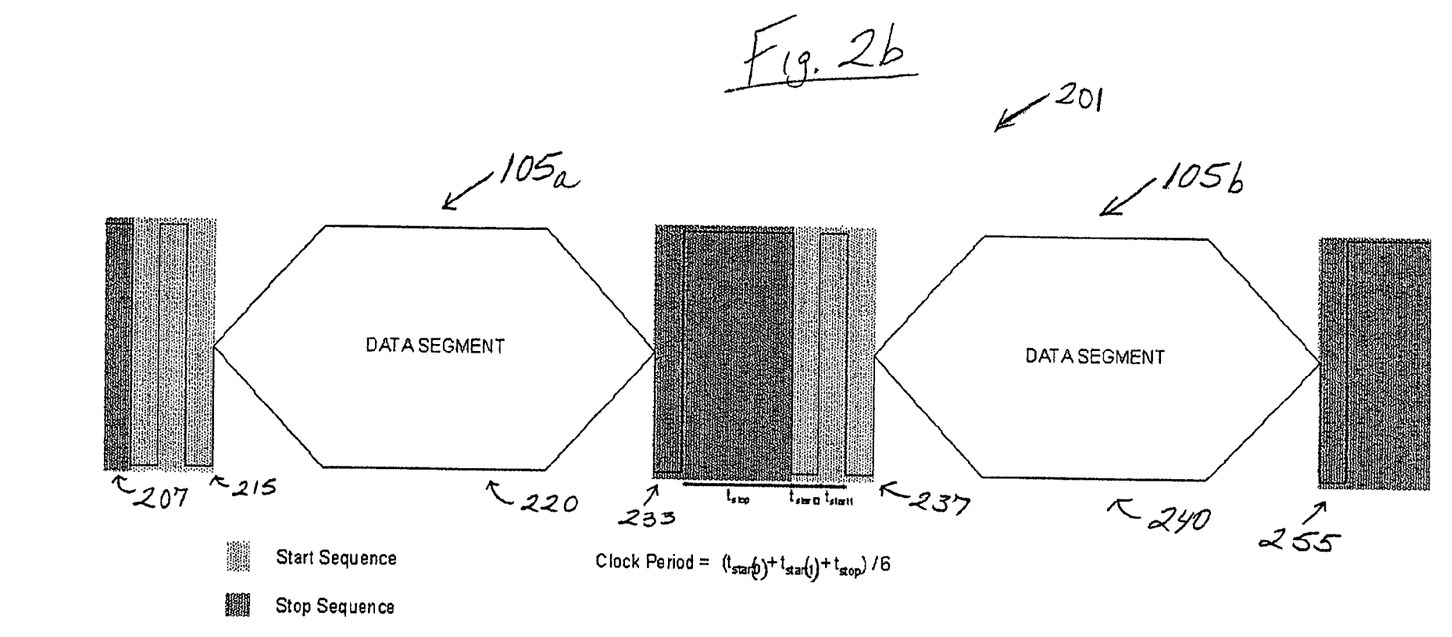
FIG. 2b depicts another embodiment of the bit stream depicted in FIG. 2a including the synchronous one-bit interface protocol depicted in FIG. 1b repeated according to an embodiment of the invention.

Referring to FIG. 2b, a bit stream 201 includes the synchronous one-bit interface protocol 105 depicted in FIG. 1b but repeated. For example, the repeated protocol 105a, 105b is used to transfer data from a screen portion 503 to a PAD 510 such that the bit stream is repeatedly transmitted from the screen portion 503 to the PAD 510 as described above.

The repeated protocol 105a, 105b depicted in FIG. 2b has the same state parameters as in FIG. 1b. The bit stream 201 of protocols 105a, 105b includes an end sequence 207 denoting the end of a previous bit stream, a start sequence 215 of a first protocol 105a, a data segment 220 of the first protocol 105a, an end sequence 233 of protocol 105a, a start sequence 237 of a second protocol 105b, a data segment 240 of the protocol 105b, and an end sequence 255 of the second protocol 105b. The bit stream in FIG. 2b in the embodiment depicted in FIG. 5 provides for flashing of screen portion 503 as follows (B denotes that the screen portion 503 displays a black screen and W denotes that the screen portion 503 displays a white screen portion):

B W B Data Segment B W W W W B W B Data Segment B W W W W . . . .

In FIG. 2b, an escape sequence for Y or more 1's in a row is transferred during the data segment such that when there are more than Y or more 1's, an additional 1 is sent. This insures that the only time four contiguous one bits are transferred is in a stop sequence.

The following are examples of encoding (converting) data into a repeated bit stream that complies with the protocol 105, 105a, 105b depicted in FIG. 1b and FIG. 2b. In the following examples, the start sequence of the bit stream is 010 and the stop sequence of the bit stream is 01111. The bits between the start and stop sequences are the data segment which corresponds to a numerical value, e.g., 431.

Data: 0xAAAA
Bit Stream: 010101010101010101001111 010101010101010101001111 . . . .
Data: 0x0431
Bit Stream: 010000000100001100010111101000000010000110001011111 . . . .
Data: 0xF0F0
Bit Stream: 010111110000111110000011110101111100001111100000111110 . . . .

Figure 3:
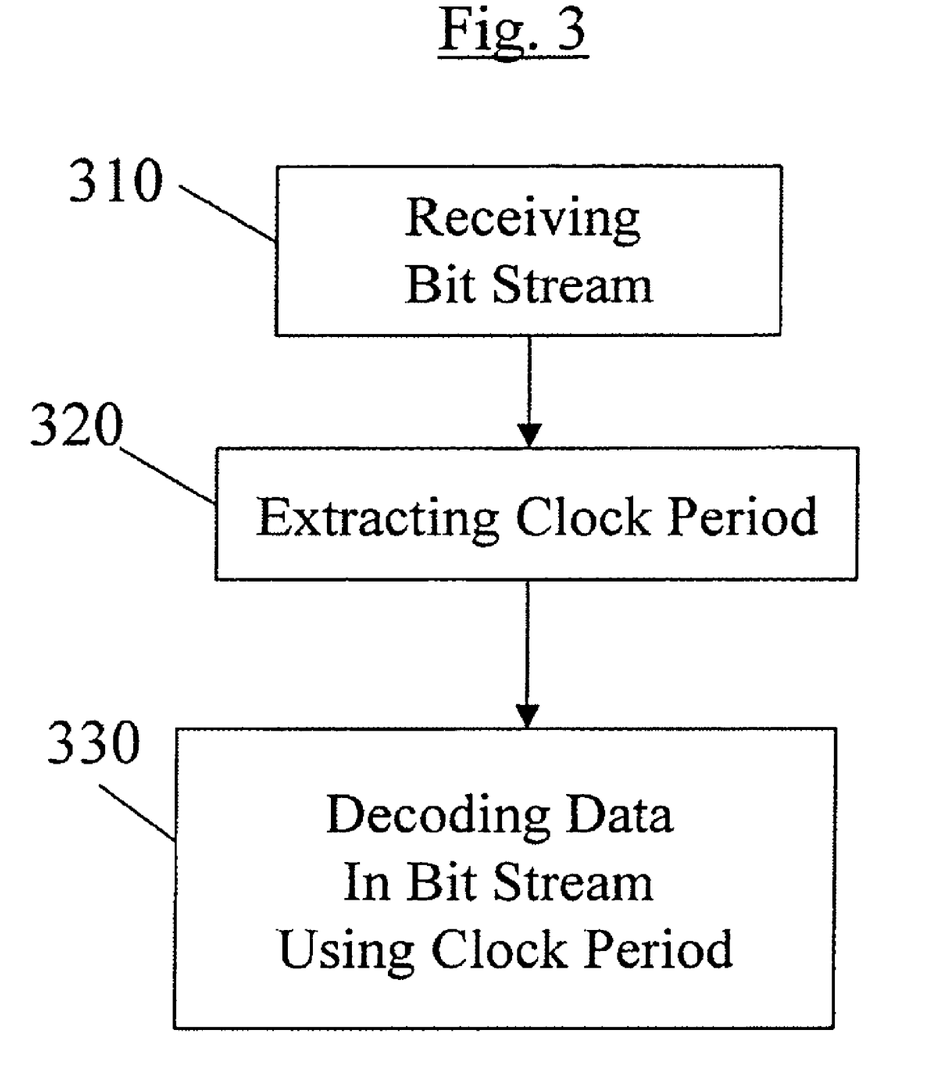
FIG. 3 depicts a flow chart illustrating the flow of a data transfer method according to an embodiment of the invention.

FIG. 3, depicts a flow for receiving and decoding a bit stream provided in accordance with embodiments of the invention. For example, in the embodiment depicted in FIG. 5, PAD 510 at the receiving end includes a data receiver which receives the bit stream and a computer processor (not shown) which processes and decodes the received bit stream. In block 310, the PAD 510 includes an optical receiver that optically receives the bit stream emitted from a screen portion 503 of a computer system 500 and passes the bit stream to the processor. In block 320, the clock period is extracted from the start and/or stop sequences of the bit stream as described above. In block 330, the data segment of the bit stream is decoded by the processor using the extracted clock period.

Figure 4:
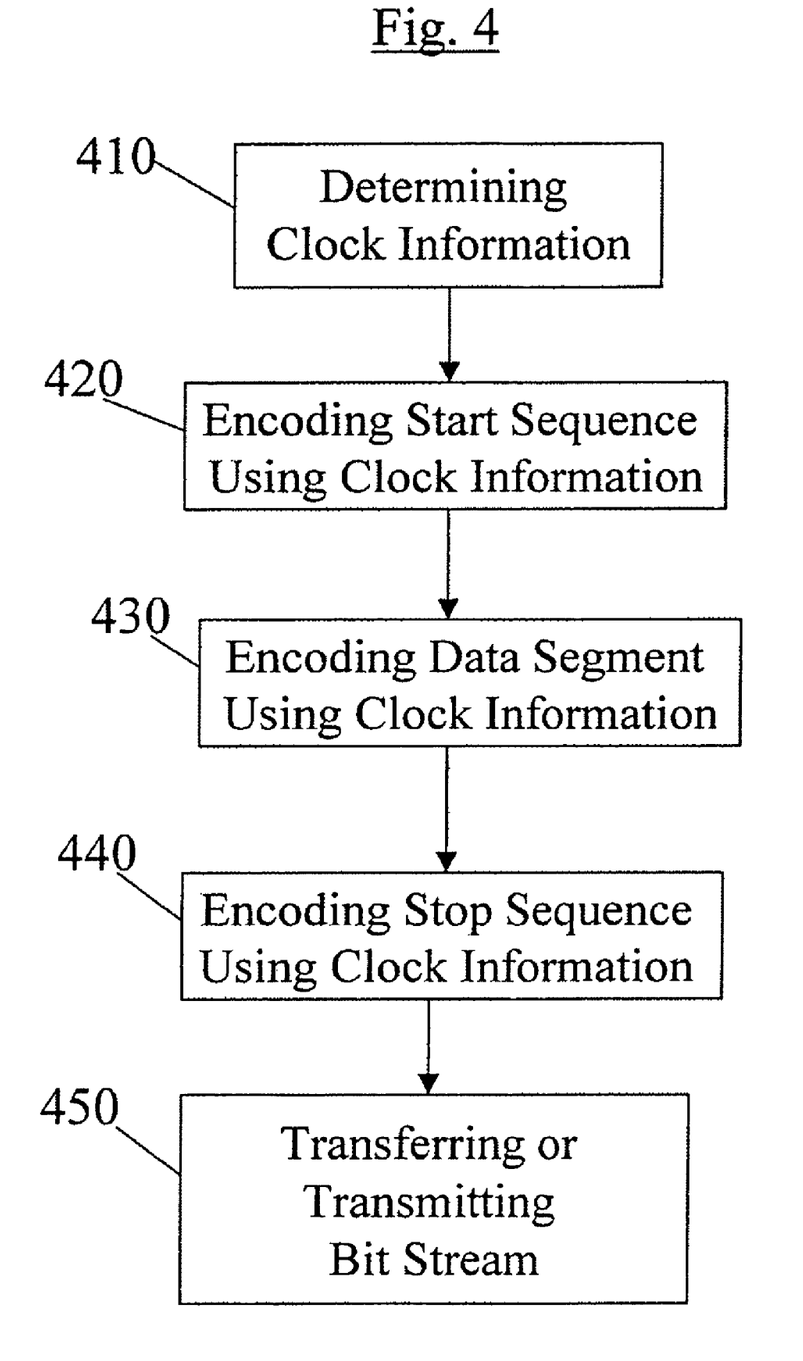
FIG. 4 depicts a flow chart illustrating the flow of a data transmission method according to an embodiment of the invention.

FIG. 4 depicts a flow for generating a bit stream provided in accordance with embodiments of the invention, and for transferring or transmitting the bit stream. In block 410, a processor of a computer, computer system or device determines the clocking information, e.g., clock period, for the bit stream. The clocking period may be a pre-set default clock period or a selectable or computed clock period. In block 420, the start sequence of the bit stream is encoded by the processor using the clock information so as to provide some or all of the information needed to extract a clock period during decoding of the bit stream. In block 430, the data segment of the bit stream is encoded by the processor using the clock information. In block 440, the stop sequence of the bit stream is encoded by the processor using the clock information, also so as to provide some or all of the information needed to extract a clock period during decoding of the bit stream. The start and stop sequences at least together provide sufficient information for extracting a clock period during decoding and also functioning as a start and end for the message or payload data 120. The encoded bit stream is transferred or transmitted, in block 450 by a communication device or transmitter, e.g., transferred from the screen portion 503 of the computer system 500 to the PAD 510.

Bit streams may be transferred or transmitted by any suitable communication device. Similarly, bit streams may be received by any suitable data receiver. Transmission or transfer of bit streams may take place over any suitable communication link or medium, e.g., a wireless communications link.

Referring to FIG. 5, as mentioned above, a personal authentication device (PAD) 510 is depicted receiving, e.g., an optically transmitted coded data structure from a computer monitor 501 of a computer system 500 in accordance with an embodiment of the invention. For example, the coded data structure is emitted by screen portion 503 for purposes of authenticating a user of a computer system 500. The computer system 500 may communicate over a network with another computer, server, computer system or device. The PAD 510 includes a processor (not shown) for decoding a bit stream and a computer-readable storing medium storing a set of instructions for decoding the bit stream. The PAD 510 is useful for facilitating user access to computer system 500 or a remote computer server, computer system or device. After the user has initiated use of the PAD 510, a bit stream, according to the protocol 100, 100a, 100b, 105, 105a, 105b of the invention, is sent from screen portion 503 to the PAD 510 for authentication purposes. The bit streams emitted by screen portion 503 may function as an access challenge signal or other signal.

PAD 510 may provide a response that is then input to computer system 500 (e.g., wirelessly, by cable or by a user operated input device). Upon verification of the response, the user is granted access to computer system 500 or a remote computer, server, computer system or device. The computer system 500 includes a remote computer, server, computer system or device, a computer-readable storage medium storing a set or sets of instructions for encoding the bit stream. The PAD 510 includes a computer-readable storage medium storing a set or sets of instructions for decoding the bit stream.

Systems and modules described herein may comprise software, firmware, hardware, or any combination(s) of software, firmware, or hardware suitable for the purposes described herein. Software and other modules may reside on servers, workstations, personal computers, computerized tablets, personal digital assistants (PDAs), and other electronic devices suitable for the purposes described herein. Software and other modules may be accessible via local memory, via a network, or via other means suitable for the purposes described herein. Data structures described herein may comprise computer files, variables, programming arrays, programming structures, or any electronic information storage schemes or methods, or any combinations thereof, suitable for the purposes described herein.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method of transmitting data using a device that comprises one or more processors, one or more memories coupled to at least one of the processors, and one or more transmitters coupled to at least one of the processors, the method comprising:
   storing first data in at least one of the memories; and
   at least one of the processors executing instructions to cause one or more of the transmitters to emit information representing a bit stream, the bit stream comprising a distinct start sequence, first data segment, and end sequence;
   wherein:
     the first data segment comprises the first data encoded using the clock period;
     a second data segment consists of the start sequence and the end sequence;
     the second data segment comprises synchronization data and data related to the clock period;
     the first data segment immediately follows the start sequence;
     the end sequence immediately follows the first data segment;
     the clock period is encoded into a pulse width of bits in the start sequence and the end sequence;
     each bit of the bit stream is assigned a set clock period, the duration of the clock periods being identical for all bits in the bit stream;
     the first data segment comprises at least one escape sequence;
     the end sequence comprises a contiguous sequence of bits that is permitted to be transmitted only in the end sequence; and
     encoding comprises inserting the at least one escape sequence into the first data segment in place of a pattern of bits in the first data the comprises the contiguous sequence of bits.

2. A computing device for transmitting data, the device comprising:
   one or more processors;
   one or more memories coupled to at least one of the processors;
   one or more transmitters coupled to at least one of the processors; and
   a computer-readable storage medium encoded with instructions that, when executed by at least one of the processors, cause the computing device to carry out a method that comprises
     storing first data in at least one of the memories, and
     causing one or more of the transmitters to emit information representing a bit stream, the bit stream comprising a distinct start sequence, first data segment, and end sequence;
   wherein:
     the first data segment comprises the first data encoded using the clock period;
     a second data segment consists of the start sequence and the end sequence;
     the second data segment comprises synchronization data and data related to the clock period;
     the first data segment immediately follows the start sequence;

the end sequence immediately follows the first data segment;

the clock period is encoded into a pulse width of bits in the start sequence and the end sequence;

each bit of the bit stream is assigned a set clock period, the duration of the clock periods being identical for all bits in the bit stream;

the first data segment comprises at least one escape sequence;

the end sequence comprises a contiguous sequence of bits that is permitted to be transmitted only in the end sequence; and encoding comprises inserting the at least one escape sequence into the first data segment in place of a pattern of bits in the first data the comprises the contiguous sequence of bits.

3. A computer-readable storage medium encoded with instructions that, when executed by one or more processors within a computing device that comprises one or more memories operatively coupled to at least one of the processors and one or more transmitters operatively coupled to at least one of the processors, cause the device to carry out a method of transmitting data that comprises:

storing first data in at least one of the memories; and at least one of the processors executing instructions to cause one or more of the transmitters to emit information representing a bit stream, the bit stream comprising a distinct start sequence, first data segment, and end sequence;

wherein:

the first data segment comprises the first data encoded using the clock period;

a second data segment consists of the start sequence and the end sequence;

the second data segment comprises synchronization data and data related to the clock period;

the first data segment immediately follows the start sequence;

the end sequence immediately follows the first data segment;

the clock period is encoded into a pulse width of bits in the start sequence and the end sequence;

each bit of the bit stream is assigned a set clock period, the duration of the clock periods being identical for all bits in the bit stream;

the first data segment comprises at least one escape sequence;

the end sequence comprises a contiguous sequence of bits that is permitted to be transmitted only in the end sequence; and encoding comprises inserting the at least one escape sequence into the first data segment in place of a pattern of bits in the first data the comprises the contiguous sequence of bits.

* * * * *